No. 735,048. PATENTED AUG. 4, 1903.
L. APPERT.
MACHINE FOR MAKING SHEET GLASS.
APPLICATION FILED FEB. 19, 1902.
NO MODEL.
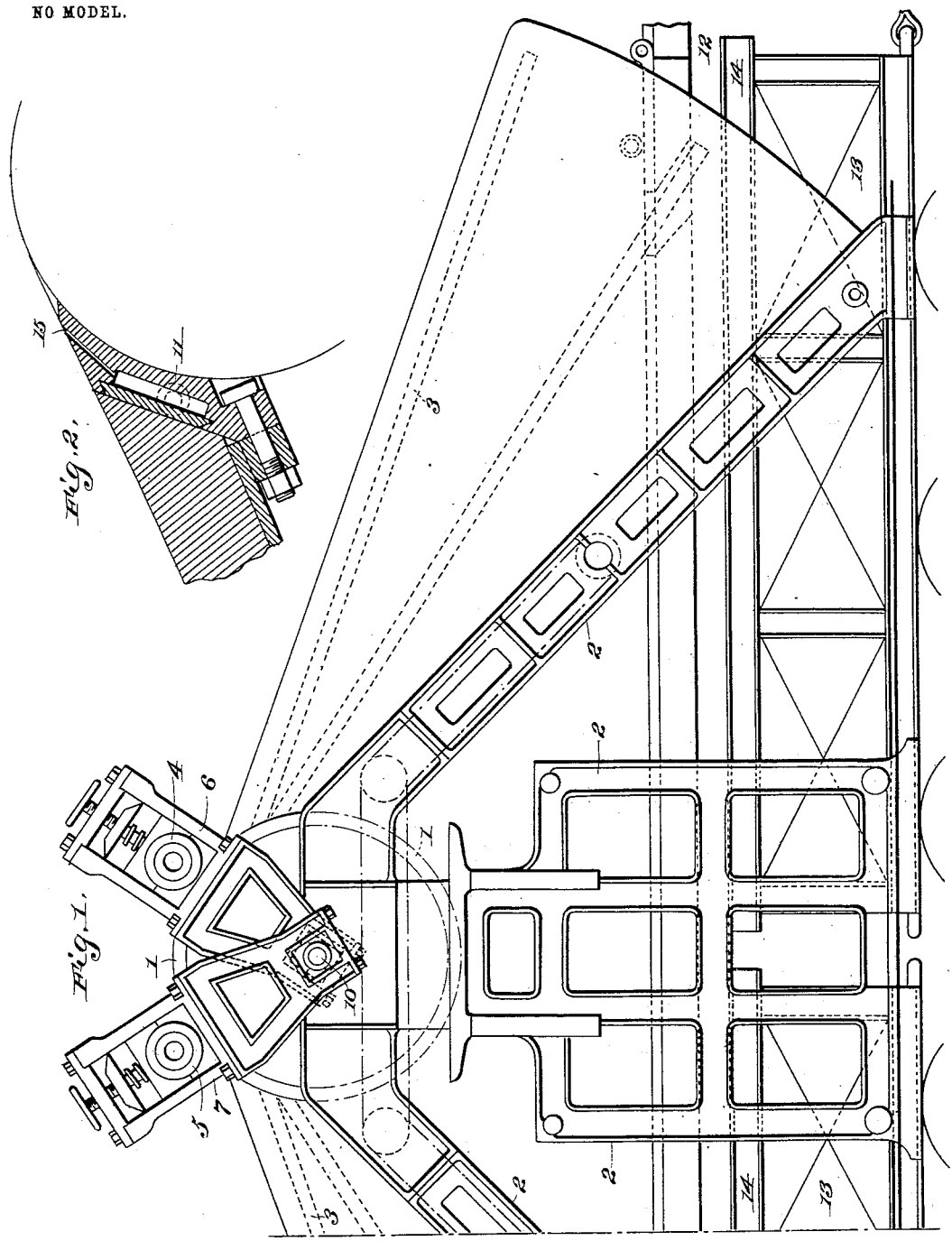
Witnesses:
Leon Appert, Inventor:
by Kerr, Page & Cooper,
Attys.

No. 735,048.

Patented August 4, 1903.

UNITED STATES PATENT OFFICE.

LEON APPERT, OF PARIS, FRANCE.

MACHINE FOR MAKING SHEET-GLASS.

SPECIFICATION forming part of Letters Patent No. 735,048, dated August 4, 1903.

Application filed February 19, 1902. Serial No. 94,728. (No model.)

*To all whom it may concern:*

Be it known that I, LEON APPERT, a citizen of the French Republic, residing at Paris, France, have invented certain new and useful Improvements in Machines for Making Sheet-Glass, of which the following is a specification, reference being had to the drawings accompanying and forming part of the same.

Most of the glass now used for the windows of dwellings or for roofs and skylights is made either by blowing or by spreading and rolling. The appearance and quality of such glass vary according as it is made by one or the other process. Rolled glass is less transparent than blown glass, but, on the other hand, resists shocks better, is more regular in thickness, and can be produced in sheets of large size without disproportionately increasing the cost. To make sheet-glass of this kind which shall be more transparent than sheets heretofore made by rolling with higher polish and planeness at the same or less cost than blown glass is the object of my present invention, which consists in the apparatus hereinafter described and claimed.

In the drawings, Figure 1 represents a side elevation of my machine, one side, a duplicate of the other, being cut away. Fig. 2 is a detail of the end of the receiving-table adjacent the large cylinder of the apparatus.

Mounted in a frame 2 2 is a polished cylinder 1, preferably hollow and of large diameter, having ribs on its inner surface to facilitate cooling. The frame also carries two cages 6 7, mounted in any convenient manner so as to be capable of partial rotation about 10 as a center. In the cages 6 7 are rolls 4 5. Any suitable means for actuating the cylinder and rolls may be employed, that which revolves the cylinder being capable of reversal, so that it may be made to rotate in either direction. The rolls should rotate in opposite directions with reference to each other, the roll 5 turning clockwise, the other turning contrary clockwise.

The cages 6 7 are arranged so that the point at which the rolls and cylinder coact is some distance below the top of the cylinder to form a receptacle for the glass to be worked. The cylinder is now started in either direction—for example, clockwise. Molten or plastic glass is now deposited in the angular space formed by the roll 4, which, it will be remembered, is rotating in the opposite direction at a speed determined by the nature of the glass being worked, its temperature, and the thickness of the sheets to be produced.

It will be readily seen that the glass will issue from the roll and cylinder in the form of a sheet. The sheet thus formed is received on a table 3, which is arranged by any convenient mechanism to turn about the same center 10 as the cages 6 7. The inclination of the table can thus be adjusted to different angles.

The end of the table adjacent the cylinder 1 is constructed, as shown in Fig. 2, with a curved surface 11, closely fitting the cylinder, and a channel 15, preferably across its entire width, from which issues a blast of air. As the sheet comes from the roll it is lifted by the air-blast, so as to cause it to glide freely onto the table 3. The entire sheet having been received thereon, the table is lowered until the sheet slides gently off onto the flattening-stone 14 on the carriage 13. The machine being preferably placed near the annealing-ovens, the carriage is immediately drawn therein after the plate has received what preliminary dressing or flattening may be necessary. As soon as the first batch of glass has been run off onto the table 3 the rotation of the cylinder is reversed and a second operation, in all respects similar to the first, is performed by means of the other roll and table, at the end of which a third is begun on the side first used, the roll 4 meanwhile having cooled sufficiently.

It will thus be seen that although alternative the operation of my apparatus is practically continuous. The large casting-cylinder may be heated to a very high temperature without impairing the efficiency of the machine, provided the surface of the cylinder is kept perfectly polished, so that sheets will be obtained with as great clearness as is possible when molten or plastic glass is brought in contact with metal. The sheets are deposited on the table ready for annealing in a highly-heated, and therefore plastic, condition, there being no opportunity for appreciable loss of heat, and a considerable economy is thus effected by the fact that there is no necessity for cooling the sheets and reheating them before annealing. Furthermore, glass better qualified to resist shocks and blows also results from this fact. The molecules of the glass, as is well known, take a "set" when the sheet is cooled, producing uneven strains both on the surface and in the body of the material. These strains or stresses must be relieved to adapt the sheet for use by the process known as "annealing"—a process somewhat uncertain in its effect. I have found that since by introducing the glass sheets into the annealing-oven before they have lost a great amount of their original heat no stresses are produced before annealing of course none result when the latter process is completed. The consequence is that the sheets possess a remarkable resistance to pressure, shocks, and strains of all kinds.

It is obvious that my invention is capable of many embodiments other than the precise construction shown, and I therefore do not consider myself limited thereto; but

What I claim is—

1. In an apparatus for making glass sheets, the combination with a cylinder on which the molten or plastic glass is deposited, of rotatable rolls on opposite sides of the cylinder, arranged to coact with the cylinder at a point below the highest point thereof, as and for the purposes set forth.

2. In an apparatus for making glass sheets, the combination with a reversible, rotating cylinder on which the molten or plastic glass is deposited, of rotatable rolls, on opposite sides of the cylinder, adapted to coact therewith, at a point below the highest point thereof, as and for the purposes set forth.

3. In an apparatus for making glass sheets, the combination with a reversible, rotating cylinder, on which the molten or plastic glass is deposited, of rotatable rolls on opposite sides of the cylinder, adapted to be arranged to coact therewith at a point below the highest point thereof, as and for the purposes set forth.

4. In an apparatus for making glass sheets, the combination with a reversible, rotating cylinder, on which the molten or plastic glass is deposited, of rotatable rolls on opposite sides of the cylinder, adapted to coact therewith at a point below the highest point thereof, and a table on each side of the cylinder to receive the sheets as they issue, as set forth.

5. In an apparatus for making glass sheets, the combination with a reversible, rotating cylinder, on which the molten or plastic glass is deposited, of rotatable rolls on opposite sides of the cylinder, adapted to coact therewith at a point below the highest point thereof, and an inclined table on each side of the cylinder to receive the sheets as they issue, as set forth.

6. In an apparatus for making glass sheets, the combination with a reversible, rotating cylinder, on which the molten or plastic glass is deposited, of rotatable rolls on opposite sides of the cylinder, adapted to coact therewith at a point below the highest point thereof, and a table adjustably inclined on each side of the cylinder to receive the sheets as they issue, as set forth.

7. In a machine for making glass sheets, the combination with means for forming the sheet, of a table to receive the same as it issues from the forming means, having at its end adjacent to such means, means for discharging a blast of air under the glass as it is received by the table, as and for the purposes set forth.

8. In an apparatus of the character described, the combination with a rotating cylinder on which the molten or plastic glass is deposited, and a roll rotating in the opposite direction, adapted to be arranged to coact with the cylinder at a point below the highest point of the cylinder, of a table to receive the glass as it issues from the cylinder and roll, having one end adjacent the cylinder, and having at its adjacent end means for discharging a blast of air under the glass as it is received by the table, as and for the purposes set forth.

9. In an apparatus of the character described, the combination with a rotating cylinder on which the molten or plastic glass is deposited, and a roll rotating in the opposite direction, adapted to be arranged to coact with the cylinder at a point below the highest point of the cylinder, of an adjustably-inclined table to receive the glass as it issues from the cylinder and roll, having one end adjacent the cylinder and having at its adjacent end means for discharging a blast of air under the glass as it is received by the table, as and for the purposes set forth.

In witness whereof I have hereunto set my hand in the presence of two witnesses.

LEON APPERT.

Witnesses:
   JULES FAYOLLET,
   EDWARD P. MACLEAN.